US012596985B2

(12) United States Patent
Hatteland et al.

(10) Patent No.: US 12,596,985 B2
(45) Date of Patent: Apr. 7, 2026

(54) MULTIPOSITION SEARCH

(71) Applicant: Autostore Technology AS, Nedre Vats (NO)

(72) Inventors: Karl Hatteland, Oslo (NO); Ragnar Stuhaug, Skjold (NO); Kristian Berge Nessa, Finnøy (NO)

(73) Assignee: AutoStore Technology AS, Nedre Vats (NO)

( * ) Notice: Subject to any disclaimer, the term of this patent is extended or adjusted under 35 U.S.C. 154(b) by 552 days.

(21) Appl. No.: 18/001,524

(22) PCT Filed: Jun. 23, 2021

(86) PCT No.: PCT/EP2021/067146
§ 371 (c)(1),
(2) Date: Dec. 12, 2022

(87) PCT Pub. No.: WO2021/260004
PCT Pub. Date: Dec. 30, 2021

(65) Prior Publication Data
US 2023/0222431 A1 Jul. 13, 2023

(30) Foreign Application Priority Data
Jun. 25, 2020 (NO) .................................... 20200742

(51) Int. Cl.
*G06Q 10/08* (2024.01)
*B65G 1/04* (2006.01)
(52) U.S. Cl.
CPC ........... *G06Q 10/08* (2013.01); *B65G 1/0464* (2013.01)
(58) Field of Classification Search
CPC .... B65G 1/0464; B65G 1/0478; B65G 1/065; B65G 1/1378; B65G 1/0492;
(Continued)

(56) References Cited

U.S. PATENT DOCUMENTS 9,827,683 B1 * 11/2017 Hance .................. G06Q 10/087
2014/0114466 A1 4/2014 Luo
(Continued)

FOREIGN PATENT DOCUMENTS

CA 3102674 A1 12/2019
CA 3102681 A1 12/2019
(Continued)

OTHER PUBLICATIONS

Wongsakorn Teksuwan, Office Action for Thai Patent Application No. 2201008372, dated Jul. 30, 2024, 8 pages, pub. by Department of Intellectual Property, Nonthaburi, Thailand.
(Continued)

*Primary Examiner* — Timothy R Waggoner
(74) *Attorney, Agent, or Firm* — Baker Botts L.L.P.

(57) ABSTRACT

A system for allocating jobs and/or targets to robots in an automated storage and retrieval system includes a plurality of robots and a framework structure forming a three-dimensional storage grid structure for storing containers. Each robot has wheels configured to move along two perpendicular horizontal directions on the grid. A central computer system manages robot movement and task allocation via a warehouse management system comprising an assigner and a router. The assigner generates lists of job and target options for each robot, which are made accessible to the router. The router assigns jobs and targets using a multi-position search algorithm based on each robot's location and the route required to reach the assigned job and target. This coordinated approach enables efficient task and path assignment within the storage system.

14 Claims, 4 Drawing Sheets

(58) Field of Classification Search
CPC .. B65G 1/1375; B65G 1/0414; G06Q 10/047;
G06Q 10/0631; G06Q 10/08355; G06Q
10/087; G06Q 10/06316; G06Q 10/08
See application file for complete search history.

(56)                    References Cited

U.S. PATENT DOCUMENTS

| | | | | |
|---|---|---|---|---|
| 2016/0132059 | A1* | 5/2016 | Mason | B65G 1/1373 |
| | | | | 701/28 |
| 2018/0265296 | A1* | 9/2018 | Beckman | B64U 70/90 |
| 2019/0015205 | A1 | 1/2019 | Rajagopal et al. | |
| 2019/0152057 | A1* | 5/2019 | Sharp | B25J 9/1664 |
| 2021/0155407 | A1 | 5/2021 | Austrheim et al. | |

FOREIGN PATENT DOCUMENTS

| | | | |
|---|---|---|---|
| CN | 103774883 | A | 5/2014 |
| CN | 107272705 | A | 10/2017 |
| CN | 110705798 | A | 1/2020 |
| CN | 110809553 | A | 2/2020 |
| GB | 2559631 | A | 8/2018 |
| NO | 317366 | B1 | 10/2004 |
| WO | 2014/075937 | A1 | 5/2014 |
| WO | 2014/090684 | A1 | 6/2014 |
| WO | 2015/193278 | A1 | 12/2015 |
| WO | 2018/146304 | A1 | 8/2018 |
| WO | 2019/232651 | A1 | 12/2019 |
| WO | 2019/238670 | A1 | 12/2019 |

OTHER PUBLICATIONS

Le Huy Anh, Office Action for Vietnamese Patent Application No. 1202208680, dated Aug. 30, 2024, 4 pages, pub. by Intellectual Property Office of Vietnam, Hanoi.
Krafft, Gerald, International Preliminary Report on Patentability, Application No. PCT/EP2021/067146, dated Dec. 25, 2022, 14 pages, pub. by the European Patent Office, Munich, Germany.
International Search Report issued in Application No. PCT/EP2021/067146 mailed on Sep. 21, 2021 (6 pages).
Written Opinion issued in Application No. PCT/EP2021/067146 mailed on Sep. 21, 2021 (9 pages).
Norwegian Search Report issued in Norwegian Application No. 20200742 mailed on Dec. 11, 2020 (2 pages).
Anonymous, Office Action in KR1020237002772, mailed Oct. 10, 2025, 8 pages, Korean Intellectual Property Office, Daejeon, Korea.
Zhang, Liang, Office Action in CN202180044632.6, mailed Jan. 8, 2026, 17 pages, The State Intellectual Property Office of the People's Republic of China, Beijing, China.
Bin Kamaludin, Asrul Nazif, Office Action in MYPI2022007148, mailed Feb. 11, 2026, 4 pages, Intellectual Property Corporation of Malaysia, Malaysia.

* cited by examiner

MULTIPOSITION SEARCH

TECHNICAL FIELD

The present invention regards a system and method for allocating jobs and/or targets to robots in an automated storage and retrieval system, and more particularly an improved system and method for allocating jobs and/or targets to the best suited robot.

BACKGROUND AND PRIOR ART

FIG. 1 discloses a typical prior art automated storage and retrieval system 1 with a framework structure 100 and FIGS. 2 and 3 disclose two different prior art robots in the form of container handling vehicles 201, 301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a, 301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c, 301c is arranged to engage with two adjacent rails of the second set 111 of rails. At least one of the sets of wheels 201b,301b,201c, 301c can be lifted and lowered, so that the first set of wheels 201b, 301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X-and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 201 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119, 120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

Each robot (i.e., each container handling vehicle) is assigned a job to perform and a target to reach and the route to take in order to reach both places. In case of a container handling vehicle the job is usually to fetch a specific container from the storage grid and the target may be to bring that container to a port where the items are picked for further distribution. In present systems an available robot is assigned a job and a target that is picked from a list of jobs and targets. The problem with allocating jobs and targets to robots and allocating the routing of robots is that these allocation functions or roles are typically separated in warehouse management systems. The assigner allocates the jobs that needs to be done and the targets to be reached. The router allocates the available robots and the route they are to take in order to reach the job and the target. Each of these allocation problems are close to impossible to solve optimally.

To perform good allocation of jobs and targets, you need as much information on the system as possible. One of the parameters used to allocate is the time it takes for the robot to reach the job. However, this information is not available until the router has finished and it is known exactly which route the robot will be allocated. To compensate for the lack of information, the assigner needs to estimate the time usage, which might not always be accurate enough to perform an optimal task allocation.

SUMMARY OF INVENTION

The present invention is set forth and characterized in the independent claims, while the dependent claims describe other characteristics of the invention.

In one aspect, the invention is related to a system for allocating jobs and/or targets to robots (container handling vehicles) in an automated storage and retrieval system comprising a plurality of robots and a framework structure forming a three-dimensional storage grid structure for storing storage containers for storing items, and where the framework structure comprises a rail system, the rail system providing available routes for the robots handling and transferring the storage containers to and from the storage columns, and wherein the at least one robot comprises a first set of wheels configured to move the robot along a first horizontal direction of the grid-based rail system and a second set of wheels configured to move the robot along a second horizontal direction of the grid-based rail system, the second direction being perpendicular to the first direction, the movement of the robots being controlled by a central computer system comprising a warehouse management system that comprises a router and an assigner wherein the assigner is configured to create a list of job options of jobs to be done and a list of target options of targets to be reached by the robots, which lists are made accessible to the router, and the router is configured to decide which job and target to be assigned to the robot using a multi-position search algorithm, the decision being based on the location of the robot in question and the route it has to travel to reach the job and the target.

Further each job and each target are given a penalty score in order to calculate the cost of deciding the robot to do that particular job and target and the router decides the robot to handle the job and the target with the lowest combined penalty score and the penalty score of the job is dependent on the distance and/or complexity of the route the robot must travel in order to reach the job and the target and the complexity of the route is the time it takes to reach the job and the target, the distance it has to travel, the number of wheel changes, the amount of time it takes to wait for gaps in traffic.

In a second aspect, the invention concerns a method for allocating jobs and/or targets to robots (container handling vehicles) in an automated storage and retrieval system comprising a plurality of robots and a framework structure forming a three-dimensional storage grid structure for storing storage containers for storing items, and where the framework structure comprises a rail system, the rail system providing available routes for the robots handling and transferring the storage containers to and from the storage columns, and wherein the at least one robot comprises a first set of wheels configured to move the robot along a first horizontal direction of the grid-based rail system and a second set of wheels configured to move the robot along a second horizontal direction of the grid-based rail system, the second direction being perpendicular to the first direction, the movement of the robots being controlled by a central computer system comprising a warehouse management system that comprises a router and an assigner, wherein the router decides which routes the robots travel and the assigner has control over which jobs are to be done and which targets to reach, and wherein the method comprises the steps of creating a list of job options in the assigner of jobs to be finished by a robot, creating a list of target options in the assigner of targets to be reached by the robot, the assigner sharing the list of job options to be finished and the list of target options to be reached with the router, deciding in the router which job and which target a robot should be assigned based upon the position of the robot in relation to the position of the job and the position of the target, deciding a route that the robot is to take in order to finish the job and reach the target, and transmitting information to the robot concerning the job and target that has been assigned to the robot and the route that has been decided for the robot.

Further each job and target are given a penalty score in order to calculate the cost of allocating the robot to that particular job and target and the robot is allocated to the job and the target with the lowest combined penalty score.

The penalty score of the job and the target is dependent on the distance and/or complexity of the route the robot must travel in order to reach the job and/or target.

By implementing this invention in a storage and retrieval system, the system is able to operate more efficiently by reducing the time the robots use on a job and a target. This ensures that the storage and retrieval system can handle more orders per day.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION

Figure 1:
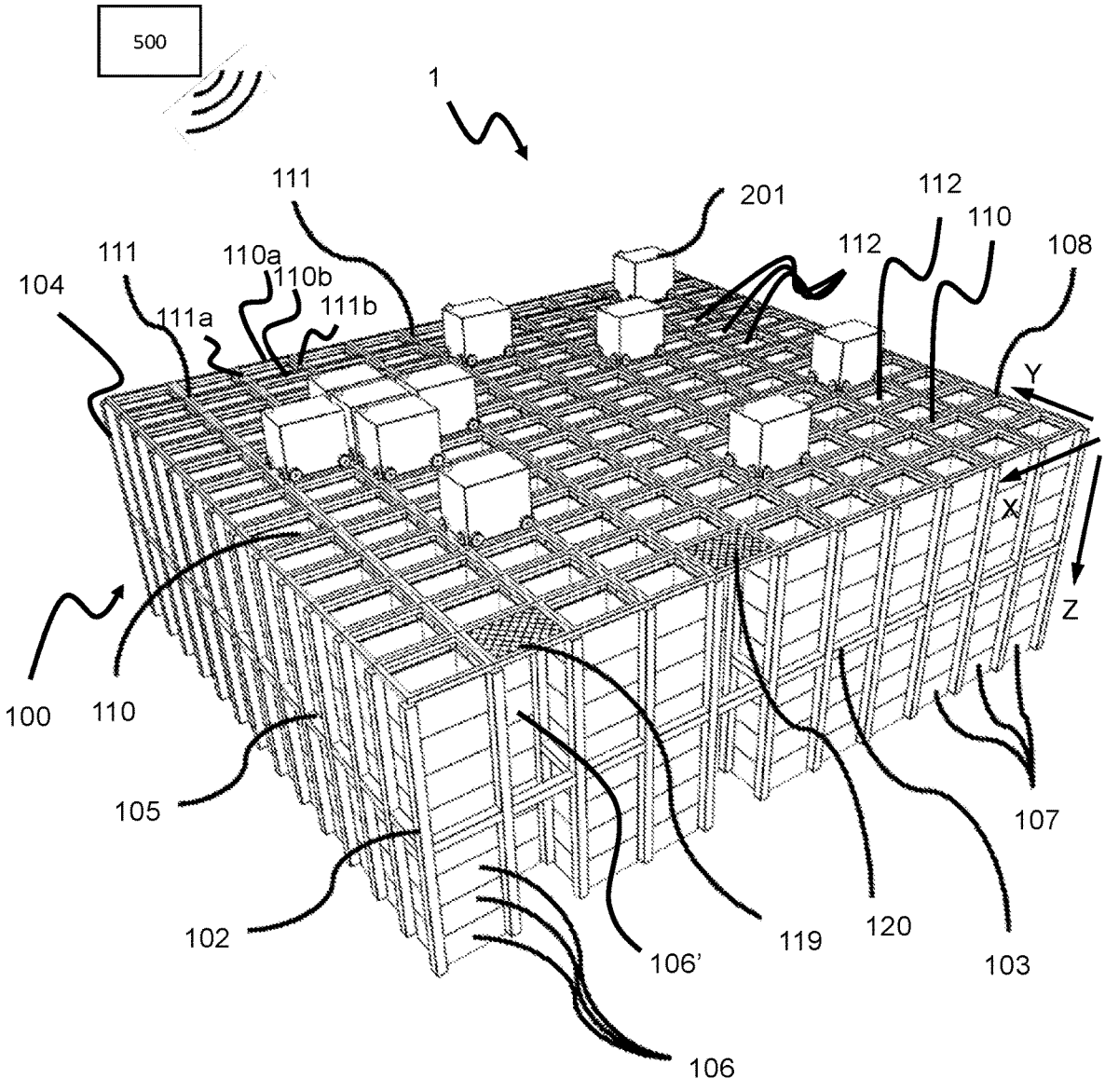
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

FIG. 1 is a perspective drawing of the storage system. The storage system is comprised of the framework structure 100. The framework structure is comprised of a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. It is understood that the framework structure can be considerably wider and/or longer and/or deeper than disclosed in FIG. 1.

For example, the framework structure 100 may have a horizontal extent of more than 700×700 columns and a storage depth of more than twelve containers.

Figure 2:
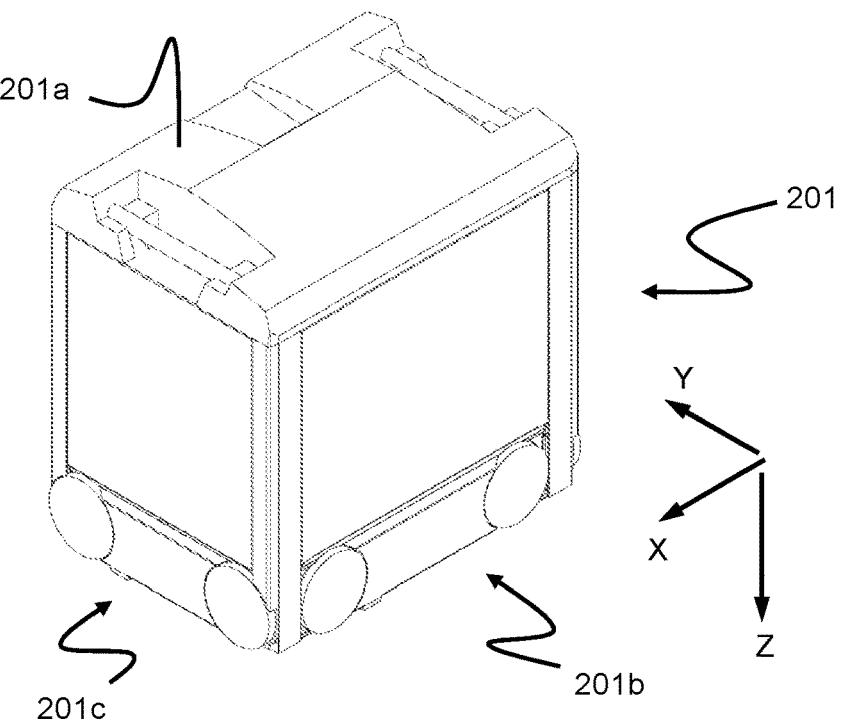
FIG. 2 is a perspective view of a prior art robot in the form of a container handling vehicle having a centrally arranged cavity for carrying storage containers therein.

FIG. 2 is a perspective view of a robot in the form of a container handling robot with a central cavity solution. The central cavity container handling vehicles 201 may have a footprint that covers an area with dimensions in the X and Y directions which is generally equal to the lateral extent of a storage column 105. Alternatively, the central cavity container handling vehicles 101 may have a footprint which is larger than the lateral area defined by a storage column 105.

Figure 3:
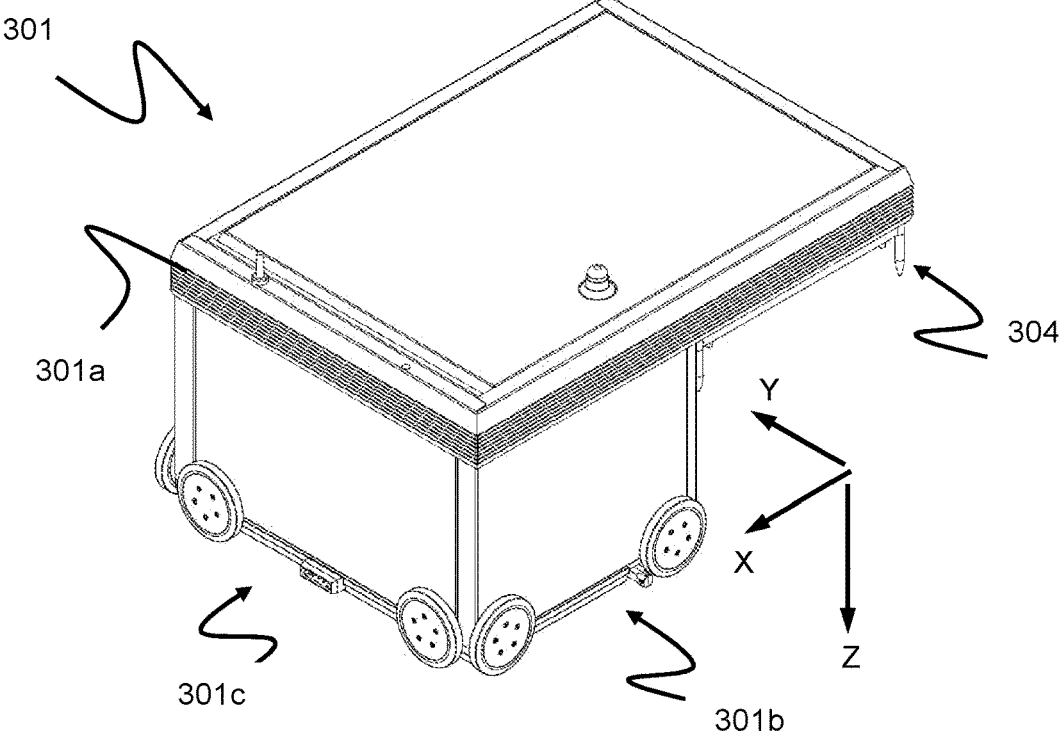
FIG. 3 is a perspective view of a prior art robot in the form of a container handling vehicle having a cantilever for carrying storage containers underneath.

FIG. 3 is a perspective drawing of a robot in the form of a container handling vehicle which has a cantilever solution. This solution has a footprint which is larger than the lateral area defined by a storage column 105. The storage containers are lifted by a lifting frame that is suspended from a cantilever part of the container handling robot.

Figure 4:
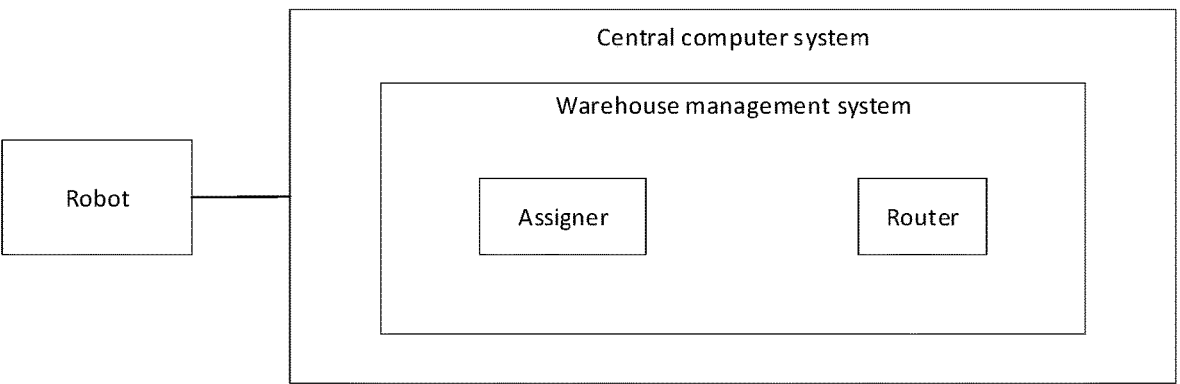
FIG. 4 is a block diagram of the different parts of the system and how they are connected.
Figure 5:
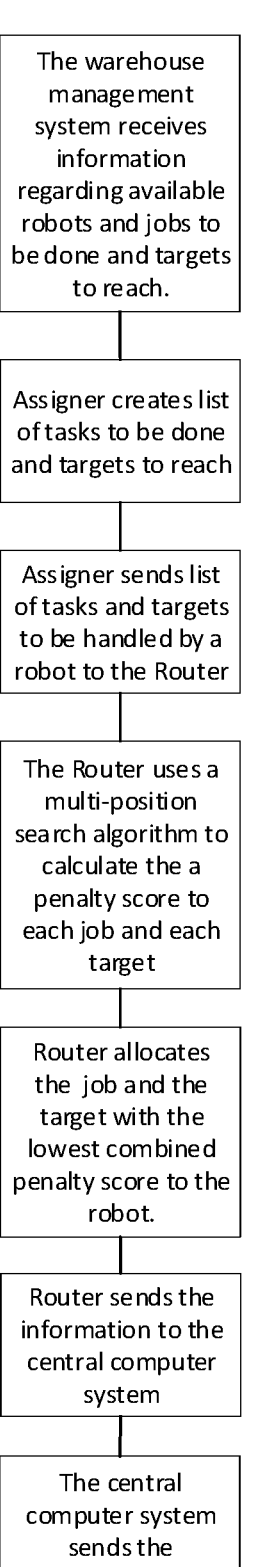
FIG. 5 is a flow diagram which show how the flow of information in the system is transmitted.

Now referring to FIGS. 4 and 5, FIG. 4 is a block diagram of the different parts of the system and how they are connected and FIG. 5 is a flow diagram which show how the flow of information in the system is transmitted.

The central computer system handles all information and data regarding the storage system. Examples are the movement of the robots, where every container in the storage system is located and what items are in the containers. Further the central computer system has a warehouse management system. The warehouse management system keeps track of what jobs to do, when to do them, where to bring the containers with the items and how to do it. In order to do this properly the warehouse management system needs to keep track of the list of jobs to do, like what items needs to be retrieved from the storage system. Further the warehouse management system needs to know where to transport the retrieved items. It also needs to know which robots that are available to handle the job, and how the robots need to manoeuvre to get to the job and the where to transport the retrieved container, this is called the target. The job and the target are called a task, so a robot is assigned a task that is comprised of a job to do and a target to reach.

In the present invention, the warehouse management system has an assigner and a router. The assigner is configured to create a list of the jobs and a list of targets a robot should do. The router is configured to pick a specific job and a specific target for the robot from the lists of jobs and targets. The picking of the specific job and target is done by the router using a multi-position search algorithm. The router chooses the specific job and target based on the combination that has the lowest cost. The cost is calculated by giving each job and each target a penalty score. The penalty score is dependent on the distance and/or complexity of the route the robot must travel in order to reach the job and/or target. The complexity of the route could e.g. be based on the time it takes to reach the job and/or the target, the distance it has to travel, the number of wheel changes and the amount of time it takes to wait for gaps in traffic.

An example would be the assigner creates a list of options where a robot Z could do job 1, 2 or 3, and reach target A, B or C. These options are then given to the router. The router uses a multi-position search algorithm to choose the job and target for robot Z that has the lowest cost in the form of the lowest combined penalty score. So, the router assigns robot Z to the task of doing job 2 and reaching target A since this option has the lowest combined penalty score.

As an alternative solution the cost could be the total cost for the choice of a particular job and target for one robot has for all the robots. E.g. if the choice of a job and a target effects the drive time of other robots. The benefit of such a solution is that it has a gain for the overall system, but the drawback is that it is a much more complex calculation.

In the preceding description, various aspects of the robot and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIGS. 1-4)

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
X First direction
Y Second direction
Z Third direction
The invention claimed is:

1. A system for allocating jobs and/or targets to robots in an automated storage and retrieval system, comprising:
    a plurality of robots, and
    a framework structure forming a three-dimensional storage grid structure for storing storage containers for storing items,
    wherein the framework structure comprises a rail system, the rail system providing available routes for the plurality of robots handling and transferring the storage containers to and from storage columns,
    wherein at least one robot comprises a first set of wheels configured to move the robot along a first horizontal direction of a grid-based rail system and a second set of wheels configured to move the robot along a second horizontal direction of the grid-based rail system, the second horizontal direction being perpendicular to the first horizontal direction, wherein a movement of the plurality of robots is controlled by a central computer system comprising a warehouse management system that comprises a router and an assigner, wherein the router decides which routes the robots travel, and the assigner controls over which jobs are to be done and which targets to reach, wherein the assigner is configured to create a list of job options of jobs to be done and a list of target options of targets to be reached by each robot, which lists of job options and target options are made accessible to the router, and wherein the router is configured to decide which job and target to be assigned to the robot using a multi-position search algorithm, a decision being based on a location of the robot in question and a route the robot in question has to travel to reach the job and the target.

2. The system according to claim 1, wherein each job and each target is given a penalty score in order to calculate cost of deciding the robot to do that particular job and target.

3. The system according to claim 2, wherein the router decides the job and the target the robot is assigned based on the lowest combined penalty score.

4. The system according to claim 2, wherein the penalty score of the job is dependent on a distance and/or complexity of the route the robot must travel in order to reach the job.

5. The system according to claim 2, wherein the penalty score of the target is dependent on a distance and/or complexity of the route the robot must travel from the job to the target.

6. The system according to claim 1, wherein complexity of the route comprises at least one of an amount of time required to reach the job and the target, a distance required to be travelled, a count of wheel changes, and an amount of time required to wait for gaps in traffic.

7. A method for allocating jobs and/or targets to robots in an automated storage and retrieval system;

wherein the system comprises:

a plurality of robots, and a framework structure forming a three-dimensional storage grid structure for storing storage containers for storing items, wherein the framework structure comprises a rail system, the rail system providing available routes for the plurality of robots handling and transferring the storage containers to and from storage columns, wherein at least one robot comprises a first set of wheels configured to move the robot along a first horizontal direction of a grid-based rail system and a second set of wheels configured to move the robot along a second horizontal direction of the grid-based rail system, the second horizontal direction being perpendicular to the first horizontal direction, wherein a movement of the plurality of robots are controlled by a central computer system comprising a warehouse management system that comprises a router and an assigner, wherein the router decides which routes the plurality of robots travel, and the assigner controls over which jobs to be done and which targets to reach, and wherein the method comprises:

creating a list of job options in the assigner of jobs to be finished by the plurality of robots, the assigner sharing the list of job options to be finished with the router, deciding in the router which job a robot should be assigned based upon the route that the robot is to take from a position of the robot in relation to a position of the job, transmitting the job that has been assigned to the robot and the route that has been decided for the robot to reach the job, creating a list of target options in the assigner of targets to be reached by the plurality of robots, the assigner sharing the list of target options to be reached with the router, deciding in the router which target a robot should be assigned based upon the route that the robot is to take from the position of the robot in relation to a position of the target, and transmitting the target that has been assigned to the robot and the route that has been decided for the robot to take in order to reach the target.

8. The method according to claim 7, further comprises giving each job a penalty score in order to calculate cost of allocating the robot to that particular job.

9. The method according to claim 8, further comprises giving each target a penalty score in order to calculate the cost of allocating the robot to that particular target.

10. The method according to claim 8, further comprises allocating the robot to the job and the target with the lowest combined penalty score.

11. The method according to claim 8, wherein the penalty score of the job is dependent on a distance and/or complexity of the route the robot must travel in order to reach the job.

12. The method according to claim 8, wherein the penalty score of the target is dependent on a distance and/or complexity of the route the robot must travel from the job to the target.

13. The method according to claim 7, wherein allocating a new job and target to the robot when the robot has finished a current target and job.

14. A computer program product stored on non-transitory computer-readable medium, when executed on a computer, causes the computer to perform a method for allocating jobs and/or targets to robots in an automated storage and retrieval system;

wherein the system comprises:

a plurality of robots, and a framework structure forming a three-dimensional storage grid structure for storing storage containers for storing items, wherein the framework structure comprises a rail system, the rail system providing available routes for the plurality of robots handling and transferring the storage containers to and from storage columns, wherein at least one robot comprises a first set of wheels configured to move the robot along a first horizontal direction of a grid-based rail system and a second set of wheels configured to move the robot along a second horizontal direction of the grid-based rail system, the second horizontal direction being perpendicular to the first horizontal direction, wherein a movement of the plurality of robots are controlled by a central computer system comprising a warehouse management system that comprises a router and an assigner, wherein the router decides which routes the plurality of robots travel, and the assigner controls over which jobs to be done and which targets to reach, and wherein the method comprises:

creating a list of job options in the assigner of jobs to be finished by the plurality of robots, the assigner sharing the list of job options to be finished with the router, deciding in the router which job a robot should be assigned based upon the route that the robot is to take from a position of the robot in relation to a position of the job, transmitting the job that has been assigned to the robot and the route that has been decided for the robot to reach the job, creating a list of target options in the assigner of targets to be reached by the plurality of robots, the assigner sharing the list of target options to be reached with the router, deciding in the router which target a robot should be assigned based upon the route that the robot is to take from the position of the robot in relation to a position of the target, and transmitting the target that has been assigned to the robot and the route that has been decided for the robot to take in order to reach the target.

* * * * *